(12) United States Patent
Negel

(10) Patent No.: US 9,290,126 B2
(45) Date of Patent: Mar. 22, 2016

(54) EXTERIOR REARVIEW MIRROR

(75) Inventor: Raimund Negel, Unterensingen (DE)

(73) Assignee: SMR Patents S.à.r.l., Luxembourg (LU)

( * ) Notice: Subject to any disclaimer, the term of this patent is extended or adjusted under 35 U.S.C. 154(b) by 148 days.

(21) Appl. No.: 14/124,179

(22) PCT Filed: Jun. 6, 2012

(86) PCT No.: PCT/EP2012/060696
§ 371 (c)(1),
(2), (4) Date: Jan. 24, 2014

(87) PCT Pub. No.: WO2012/168297
PCT Pub. Date: Dec. 13, 2012

(65) Prior Publication Data
US 2014/0146408 A1 May 29, 2014

(30) Foreign Application Priority Data

Jun. 8, 2011 (DE) .......................... 10 2011 103 547

(51) Int. Cl.
*B60R 1/08* (2006.01)
(52) U.S. Cl.
CPC ...................................... *B60R 1/082* (2013.01)
(58) Field of Classification Search
CPC ....................................................... B60R 1/082
USPC ........................................................... 359/844
See application file for complete search history.

(56) References Cited

U.S. PATENT DOCUMENTS

| 6,717,712 B2 * | 4/2004 | Lynam et al. ................ 359/265 |
| 7,775,672 B2 | 8/2010 | Kilie et al. |

FOREIGN PATENT DOCUMENTS

| DE | 36 20 228 A1 | 12/1987 |
| DE | 296 17 073 U1 | 11/1996 |
| DE | 297 04 227 U1 | 6/1997 |
| DE | 298 15 616 U1 | 1/1998 |
| DE | 101 23 977 A1 | 12/2002 |
| EP | 0 692 407 A1 | 1/1996 |
| EP | 1 972 497 A2 | 3/2008 |

* cited by examiner

*Primary Examiner* — Bumsuk Won
*Assistant Examiner* — Grant Gagnon
(74) *Attorney, Agent, or Firm* — Jones Day

(57) ABSTRACT

An exterior rearview mirror with a mirror glass that is embedded in a mirror head, where the mirror head is pivotably supported against a mirror base by being fastened to the vehicle, where the mirror glass includes at least two mirror parts having different radii of curvature, in that a separating line between the mirror parts passes through the area that meets the imaging specifications.

4 Claims, 3 Drawing Sheets

Prior Art

EXTERIOR REARVIEW MIRROR

CROSS REFERENCE TO RELATED APPLICATION

This application is a national stage application of International Application No. PCT/EP2012/060696 filed on Jun. 6, 2012, which claims the benefit of Germany Patent Application No. 10 2011 103 547.1 filed on Jun. 8, 2011, the entire contents of both applications being incorporated herein by reference.

The embodiments of the present invention relate to an exterior rearview mirror for a vehicle which is optimized such that the mirror glass is minimized in size.

BACKGROUND OF THE INVENTION

Motor vehicles must comprise devices for indirect vision to meet registration requirements. The indirect vision systems currently are reflective glasses that are mounted to the vehicle. The requirements for mounting the indirect vision systems and their configuration for covering the required fields of view are determined in various national or supranational regulations.

These requirements lead to different reflective glasses that are used for imaging the indirect image.

PRIOR ART

ECE Regulation R 46 stipulates the fields of view and glasses of exterior rearview mirrors and related requirements.

In the territory where ECE regulations apply, permissible glasses for exterior mirrors on the driver and passenger sides may be plane, spherically convex, or spherically convex with an aspherical part.

It is especially the spherically convex glasses with an aspherical part that offer the user an expanded field of vision that reduces blind spots.

But the aspherical part makes the entire mirror larger because the field of vision requirements are not met in the aspherical section, not even in part, according to the current regulation. The aspherical part is there for convenience so that the driver only has to deal with a reduced blind spot.

In the prior art, the aspherical part of the mirror glass is always located on the outer rim of the mirror that faces away from the vehicle.

U.S. Pat. No. 6,717,712 discloses plane exterior rearview mirrors that have additional sections which are curved. Since the plane reflective glasses that are permitted and required in the United States only provide a limited field of vision on the driver side, mirror inserts called "spotters" are allowed. These inserts may also be aspherical and are inserted in different places into the mirror glass, however, the plane reflective surface required for achieving the mandatory field of vision must be retained.

In order to comply with the registration regulations, no section of the field of vision is shown in the curved part of the exterior mirror glass.

The resulting size of the mirror glass prevents smaller and more aerodynamic designs of exterior mirrors.

It is an object of the embodiments of the present invention to reduce the size of the mirror glass and at the same time to retain its functionality of reducing blind spots for the driver.

BRIEF DESCRIPTION OF THE INVENTION

The embodiments of the present invention are shown in the figures and explained in the description below.

The explanations below refer to the ECE regulations that apply in many countries worldwide. Furthermore, the description below is with reference to a vehicle with the steering wheel on the left-hand side. But the embodiments of the present invention are also valid for other regulations and for right hand drive vehicles.

Figure 1:
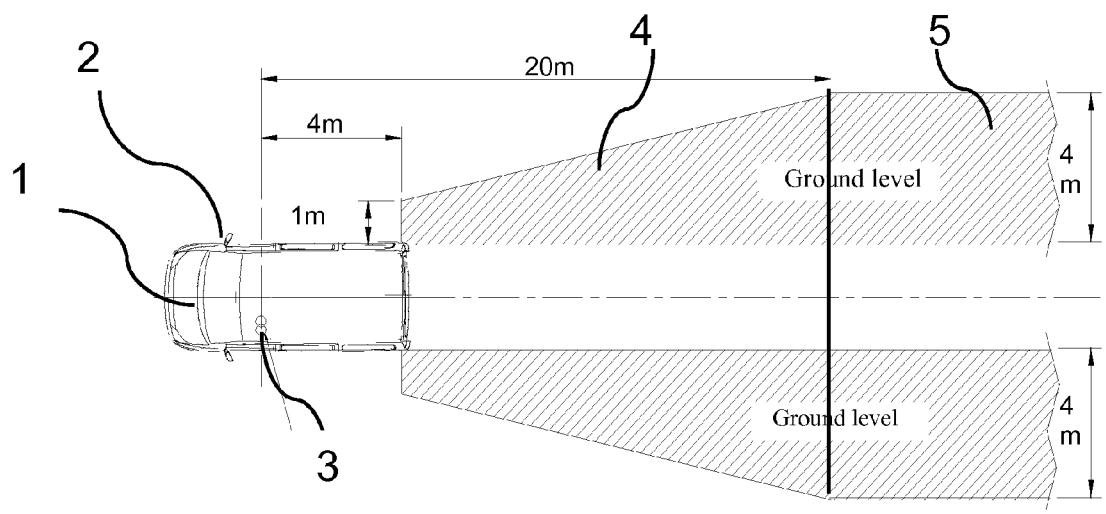
FIG. 1 shows field of vision requirements under ECE Rule 46

FIG. 1 shows an example of a vehicle 1 with two exterior mirrors 2 mounted to its outer side. Reference number 3 in the figure defines the driver's ocular points. The ECE regulation requires two ranges as mandatory field of vision: a close range and a far range. The close range 4 defines a width of 1 m next to the vehicle, wherein the close range starts at a distance of 4 m from the driver's ocular points in the longitudinal axis of the vehicle. The close range ends 20 m behind the driver's ocular points. The far range 5 defines a strip 4 m in width starting from 20 m behind the ocular points of the driver.

Both ranges of vision must be visible in the mirror glass on the driver and on the passenger side.

Figure 2:
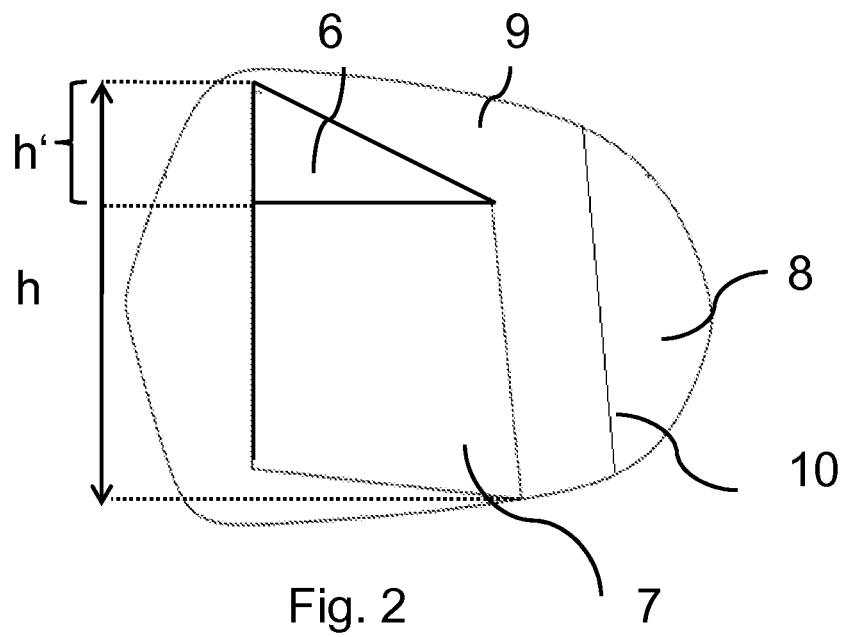
FIG. 2 shows a right mirror on the passenger side

FIG. 2 shows an example of a right-hand exterior mirror according to prior art. The reflective surface shows the border lines of the field of vision required to comply with the regulation. The upper section 6 shows the far range of view and the lower section 7 shows the close range of view as a line in the surface of the mirror.

A separating line 10 separates the convex mirror part 9 from the aspherical mirror part 8. Both fields of vision of the near and far range are reflected on the convex mirror surface. The far range of view of the mirror can only be compliant with the rules if the mirror has a specific overall height. This minimum height h of the mirror glass is formed by the height of the reflection in the near and far range to an overall height h.

Figure 3:
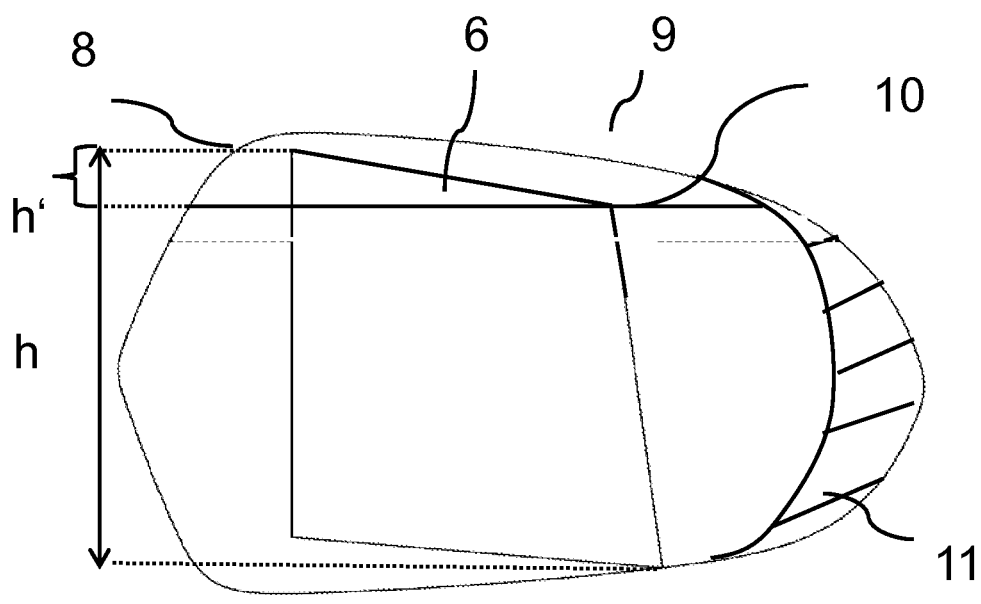
FIG. 3 shows a solution according to the embodiments of the present invention

FIG. 3 shows the inventive solution for reducing the reflective surface area. The aspherical mirror part 8 is arranged such that the far range 6 is reflected in this mirror part. Since the radii of the aspherical mirror part decline, the image of the far range can be shown on a smaller area, and the height h' becomes smaller. The overall height h of the reflections becomes smaller in total, including the reflection of the close range, and the overall height mirror can be reduced.

The hatched section can also be eliminated if the aspherical part 8 is placed on the top edge of the mirror glass. The total height and width of the mirror as a whole are considerably reduced by showing the field of vision in the aspherical part 8 of the mirror, however, the function of the mirror part 8 of increasing driving comfort is maintained.

Alternatively to a position at the top edge of the mirror glass, the aspherical part may also be positioned at the bottom or on the far side or obliquely. A portion of the near or far range is shown in the spherical part 8 of the mirror. The separating line shown in the figure does not have to be shown on the mirror glass, e.g. as a black line. The separating line marks the transition between the convex and the aspherical mirror part.

Figure 4:
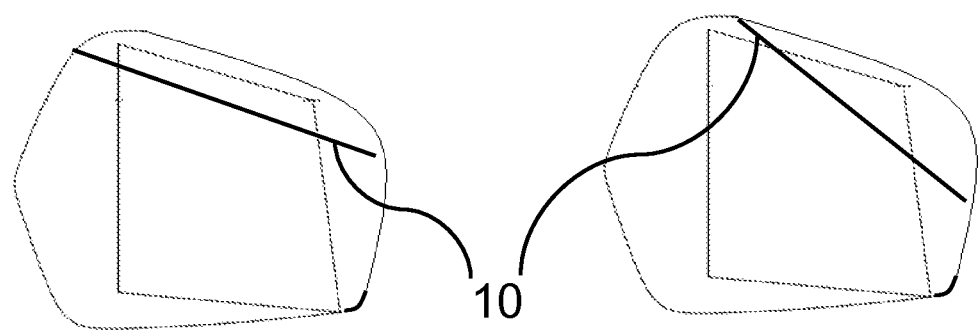
FIG. 4 shows alternative solutions.

FIG. 4 shows alternative positions for installing the aspherical part of the mirror glass. In all cases drawn here, the reflection of the mandatory fields of vision extends into the aspherical part. And in the embodiments shown, the far range 6 is at least partially reflected in the aspherical mirror part.

The embodiments of the present invention are not limited to the use of mineral glass; plastic mirrors with the division according to the embodiments of the present invention are included as well.

The invention claimed is:

1. An exterior rearview mirror comprising:
a mirror head;
a mirror glass embedded in the mirror head;
a mirror base;
wherein the mirror head is pivotably supported against the mirror base by which the exterior rearview mirror is fastened to the vehicle,
wherein the mirror glass includes at least two mirror members having different radii of curvature, one mirror member being aspherical,
a separating line which marks a transition between the at least two mirror members, and
an upper area reflecting a far range and a lower area reflecting a close range are provided to represent the close range and the far range field of visions,
wherein the separating line extends relative to the upper area and lower area such that the aspherical mirror member includes at least a portion of the image of the far range.

2. The exterior rearview mirror according to claim 1, wherein the aspherical mirror member is disposed at the top edge, bottom edge or outer edge of the mirror glass.

3. The exterior rearview mirror according to claim 1, wherein the aspherical mirror member includes a portion of the image of the close range.

4. The exterior rearview mirror according to claim 1, wherein the other mirror member is spherically convex.

* * * * *